US005938824A

United States Patent [19]

Conradie et al.

[11] Patent Number: 5,938,824

[45] Date of Patent: Aug. 17, 1999

[54] SUPERSATURATED SOLUTIONS AND A METHOD OF PREPARING SUPERSATURATED SOLUTIONS

[75] Inventors: Wilhelm Eduard Conradie; Philip Turner, both of Pretoria; Frederick Willem Greeff, Fort Beaufort, all of South Africa

[73] Assignees: CSIR; Rekara Mills (Proprietary) Limited, both of South Africa

[21] Appl. No.: 08/641,290

[22] Filed: Apr. 30, 1996

Related U.S. Application Data

[62] Division of application No. 08/186,497, Jan. 24, 1994, abandoned.

[30] Foreign Application Priority Data

Jan. 29, 1993 [ZA] South Africa ........................... 93/0660

[51] Int. Cl.[6] .............................. C09D 5/02; B27K 3/52; C09K 21/00

[52] U.S. Cl. ...................... 106/15.05; 106/18; 106/18.11; 106/18.13; 106/18.14; 106/18.21; 106/18.27; 106/18.29; 106/18.3; 106/18.31; 106/18.32; 106/18.33; 106/18.36; 252/309; 252/607

[58] Field of Search .................................... 252/309, 606, 252/7, 607; 162/159; 106/18, 18.11, 18.13, 18.14, 18.21, 18.27, 18.29, 18.3, 18.31, 18.32, 18.36, 15.05, 18.33

[56] References Cited

U.S. PATENT DOCUMENTS

| | | | |
|---|---|---|---|
| 2,314,242 | 3/1943 | Porter, Jr. | 106/18 |
| 3,376,144 | 4/1968 | Stutz | 106/18.28 |
| 3,378,381 | 4/1968 | Draganov | 106/15 |
| 3,553,128 | 1/1971 | Wilson | 252/309 |
| 3,637,022 | 1/1972 | Kelly et al. | 252/309 |
| 3,955,987 | 5/1976 | Schaar et al. | 252/7 |
| 3,981,806 | 9/1976 | Di Bella et al. | 252/608 |
| 4,212,675 | 7/1980 | Robinson | 106/18.15 |
| 4,287,239 | 9/1981 | Hager | 427/351 |
| 4,325,993 | 4/1982 | Schroder | 427/315 |
| 4,502,859 | 3/1985 | Knobloch | 8/94.29 |
| 4,572,733 | 2/1986 | Howard | 71/64.08 |
| 4,588,510 | 5/1986 | Salyer et al. | 252/7 |
| 4,649,065 | 3/1987 | Hein et al. | 427/370 |
| 4,863,534 | 9/1989 | Forsberg | 252/309 |
| 4,897,291 | 1/1990 | Kim | 427/393 |
| 4,919,179 | 4/1990 | Chattopadhyay | 149/2 |
| 5,008,037 | 4/1991 | Weete et al. | 252/308 |
| 5,098,472 | 3/1992 | Watkins et al. | 106/15.05 |
| 5,112,533 | 5/1992 | Pope et al. | 252/607 |
| 5,156,652 | 10/1992 | Gregoli et al. | 252/312 |
| 5,445,663 | 8/1995 | Carlsen et al. | 71/64.08 |

FOREIGN PATENT DOCUMENTS

| | | | |
|---|---|---|---|
| 444151 | 5/1977 | Spain . | |
| 1071450 | 2/1984 | U.S.S.R. . | |
| 1069640 | 5/1967 | United Kingdom . | |
| 1069640 | 10/1967 | United Kingdom | A01N 11/02 |

OTHER PUBLICATIONS

Webster's II new Riverside University Dictionary, (Riverside Publishing Company, Boston, MA, Month Unavailable 1984) pp. 1163.

Hawley's Condensed Chemical Dictionary, 11th Edition, (Van Nostrand Reinhold Company, Inc., NY, NY, Month Unavailable 1987) pp. 1111.

(List continued on next page.)

*Primary Examiner*—Richard D. Lovering
*Assistant Examiner*—Daniel S. Metzmaier
*Attorney, Agent, or Firm*—Brinks Hofer Gilson & Lione

[57] ABSTRACT

The invention provides a method of preparing a supersaturated solution of an inorganic solute in an aqueous solvent, to such solutions and to a method of treating wood by impregnating it with such solutions. The method of preparing the solution involves mixing an aqueous solvent and salt solute together with an organic dopant comprising an emulsifier and an oil or wax, so that the eventual solution comprises an aqueous phase in which the solute is dissolved, the proportions of the constituents being selected so that the aqueous phase is a supersaturated solution of the inorganic salt solute in the solvent.

1 Claim, 1 Drawing Sheet

OTHER PUBLICATIONS

Becker, Treatment of Wood by Diffusion of Salts, Wildhaus, Switzerland, May 12–15, 1976.

Vinden et al., Developments in Wood Preservation Processing Techniques, Raleigh, North Carolina, USA, May 5–9, 1980.

Sonti et al., Study on the Treatment of Construction Timbers by Diffusion Methods, Surfer's Paradise, Australia, May 9–13, 1983.

Iddi, Aspects of Diffusion of Boron Through Wood, Ronneby, Sweden, May 28–Jun. 1, 1984.

Vinden, Preservative Treatment of Green Timber by Diffusion, Ronneby, Sweden, May 28–Jun. 1, 1984.

Vinden et al., Preservative Treatment of Green Timber by Soaking in Ammoniacal Cooper Borate, Ronneby, Sweden, May 28–Jun. 1, 1984.

Vinden et al., Options for Accelarated Boron Treatment: A Practical view of Alternatives, Guaraja, Brazil, May 12–17, 1985.

Page et al., Diffusion Treatment of Gauged Radiata Pine Timber using BORACOL 20, Honey Harbour, Ontario, Canada, May 17–22, 1987.

Supriana et al., The Treatability of Five Indonesian Wood Species with BFCA Preservatives, Honey Harbour, Ontario, Canada May 17–22, 1987.

Vinden, Preservative Treatment of Wood by Diffusion Process—Stimulation of Commercial Treatment Processes, Madrid, Spain, Apr. 24–29, 1988.

Vinden, Factors Affecting the Sorption of Preservative during Diffusion Treatment of Wood, Madrid, Spain, Apr. 24–29, 1988.

Konabe, Dip–Diffusion of Dressed Timber—Effect of Drying, Lappeenranta, Finland, May 22–26, 1989.

Konabe, Dip–Diffusion of Dressed Timber—Effect of Drying, Rotorua, New Zealand, May 13–18, 1990.

Vinden et al., Thickened Boron Treatment, Rotorua, New Zealand, May 13–18, 1990.

Database WPI, Week 9146, London: Derwent Publications Ltd., AN–91–337629, Class B27, SU 161333–A (Wood–M-ACH Ind Res), Abstract.

Database WPI, Week 8439, London: Derwent Publications Ltd., AN–84–242685, Class B27, SU 1071450 (Plyn Res Inst), Abstract.

Data WPI, Week 7847, London: Derwent Publications Ltd., AN–78–85297A, Class B27, SU–586994 (Yeneer Res Inst), Abstract.

Harrow, Diffusion Impregnation of Building Timber with Boron Compounds, N.Z. Timber J., 2, (6 pages), Nov.–Dec. 1955.

Tamblyn et al., Preservative Treatments of Plywood by Momentary Dipping of Green Veneer, Division of Forest Products Technology Paper No. 6, Commonwealth Scientific and Industrial Research Organization, Australia, 1959.

Harrow, Durability of Treated Radiata Confirmed, N.Z. Timber J., Jun. 1960, pp. 42–44 (with annexed copy of p. 71 of the Sep. 1959 edition of N.Z. Timber J., dealing with the subject tests).

McQuire et al., Accelerated Boron Diffusion Treatmetn of Timber, N.Z. J. Forest Science, 2, 165–187 (Jun. 1972).

Chambers—"Dictionary Of Science And Technology", 1971 (pp. 337, 1032, 1145).

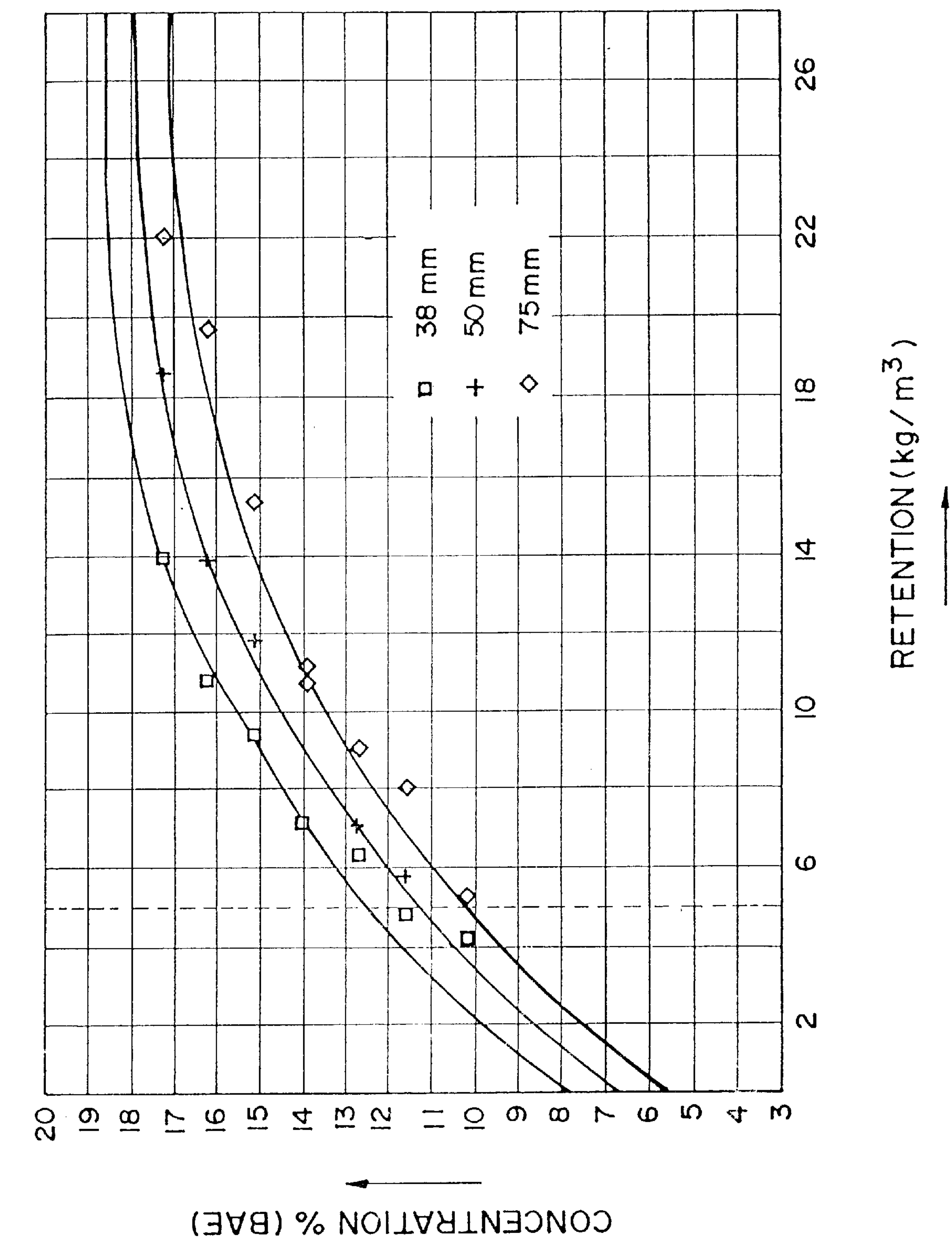
38 mm
50 mm
75 mm
RETENTION (kg/m3)
CONCENTRATION % (BAE)
2
6
10
14
18
22
26
3
4
5
6
7
8
9
10
11
12
13
14
15
16
17
18
19
20

SUPERSATURATED SOLUTIONS AND A METHOD OF PREPARING SUPERSATURATED SOLUTIONS

This application is a division of U.S. patent application Ser. No. 08/186,497 filed Jan. 24, 1994 (now abandoned).

FIELD OF THE INVENTION

THIS INVENTION relates to the preparation of supersaturated solutions. More particularly the invention relates to a method of preparing a supersaturated solution, and to a supersaturated solution prepared in accordance with the method, the method being suitable for the preparation of a supersaturated solution of an inorganic salt solute in an aqueous solvent, useful eg for the impregnation of wood; and the invention also extends to a method of impregnating wood using such a solution.

SUMMARY OF THE INVENTION

This invention is directed to a method of preparing a solution of an inorganic salt solute in an aqueous solvent such that the solution is supersaturated at ambient temperatures below 30° C. In an initial step, a liquid aqueous solvent and a liquid organic dopant comprising both an emulsifier and a constituent selected from the group consisting of oils, waxes and mixtures thereof, are mixed at temperatures above 30° C. to form an emulsion. Thereafter, an amount of the solute is dissolved in the aqueous phase of the emulsion. The proportions of each component of the mixture is selected such that the amount of solute in the water is greater than that of a saturated aqueous solution of the same solute at the same temperature.

Another embodiment is directed to a method of preparing a supersaturated solution of an inorganic salt in an aqueous solvent such that the solution is supersaturated at ambient temperatures below 30° C. The aqueous solvent, the salt and an organic dopant comprising both a water-in-oil emulsifier and a constituent selected from the group consisting of oils, waxes and mixtures thereof are mixed to form a water-in-oil emulsion, wherein the proportions of each component of the mixture is selected such that the amount of solute in the water is greater than that of a saturated aqueous solution of the same solute at the same temperature, and wherein the water:dopant mass ratio is between 40:60 and 80:20.

The invention is also directed to a water-in-oil solution made according to the foregoing methods, wherein the salt is selected from wood preservative salts and flame retardant salts.

BRIEF DESCRIPTION OF THE DRAWING

The Figure corresponds to Example 3, and is a plot of the concentration of boric acid equivalent (BAE) in the test solution against the BAE retained in various wood specimens.

DETAILED DESCRIPTION OF THE INVENTION

According to one aspect of the invention there is provided a method of preparing a solution of an inorganic salt solute in an aqueous solvent which is supersaturated at ambient temperatures below 30° C. with regard to said solute, the method including a mixing step whereby an aqueous solvent, an inorganic salt solute and an organic dopant comprising both an emulsifier and a constituent selected from the group consisting of oils, waxes and mixtures thereof are mixed together, thereby to produce a mixture comprising an emulsion having an aqueous phase having the solute dissolved therein, the proportions of the constituents of the mixture being selected so that the mass ratio of said dissolved solute:water in the aqueous phase is greater than that in a saturated solution of said solute in said aqueous phase at the same temperature.

By a supersaturated solution, which can also be regarded as a supercooled solution, is meant a solution which, at the temperature at which it is considered, comprising a solvent having, dissolved therein, a proportion of a solute which is higher than the proportion of said solute which would be dissolved in said solvent in a saturated solution of said solute in pure form in said solvent in pure form, at the temperature in question.

When the dopant is a wax or oil, the mixing step may comprise an emulsification step; and the emulsification step may comprise using an organic emulsifier to facilitate the emulsification.

In other words, the mixing step may comprise mixing the solvent and solute with a said dopant which comprises both an organic emulsifier and an organic constituent selected from the group consisting of waxes, oils, and mixtures thereof, the mixture formed by the mixing step being in the form of an emulsion comprising said aqueous phase emulsified with an organic phase.

The emulsifier is thus conveniently an emulsifier suitable for emulsifying a mixture of an aqueous liquid phase and an organic liquid phase such as a mixture of water and oil or molten wax. The emulsifier may be a so-called oil-in-water emulsifier, ie an emulsifier suitable for preparing an oil-in-water emulsion, in which the organic phase forms the discontinuous phase in the form of droplets dispersed in the aqueous phase, which is continuous; or the emulsifier may be a water-in-oil emulsifier, suitable for preparing a water-in-oil emulsion.

Conveniently the emulsifier is a water-in-oil emulsifier, the emulsification comprising dispersing the aqueous phase in the organic constituent to form a water-in-oil emulsion in which the aqueous phase is discontinuous and the organic phase is continuous.

The method may comprise an initial mixing step whereby the dopant is mixed with the aqueous solvent to form an initial mixture comprising said aqueous phase emulsified with the dopant, followed by a further mixing step whereby the solute is mixed with the initial mixture, to form said mixture comprising the supersaturated solution.

The initial mixing step may be carried out at an elevated temperature, above 30° C., preferably above 50° C., eg 70° C., at which all the constituents of the initial mixture are liquid; and the further mixing step may take place at ambient temperature and below 30° C.

The mixing may be such as to provide a mass ratio between the water in the aqueous phase and the dopant of 40:60 to 80:20.

According to another aspect of the invention there is provided a solution of an inorganic solute in an aqueous solvent, the solution being supersaturated at temperatures below 30° C., the solvent comprising an aqueous phase having, dispersed therein, an organic dopant comprising both an emulsifier and a constituent selected from the group consisting of oils, waxes and mixtures thereof, and the mass ratio between the water in the aqueous phase and the dopant being 40:60 to 80:20.

The dopant may be emulsified with the aqueous phase. In this case the emulsifier may be a water-in-oil emulsifier, the dopant and aqueous phase forming a water-in-oil emulsion.

The dopant may comprise a wax which is selected from beeswax, chlorinated paraffin waxes, polyethylene waxes and mixtures thereof.

While the wax may be a natural wax, such as beeswax, synthetic waxes such as chlorinated paraffin waxes, polyethylene waxes and the like are preferred. More particularly, the wax may be a soft paraffin wax or slack wax; or it may be a blend of a so-called soft paraffin wax or slack wax, together with at least one so-called hard or high-melting-point oxidized wax.

A soft paraffin wax or slack wax is an oily wax, ie a wax having a relatively low congealing point, typically about 15–50° C., having a typical wax content of 75–90, eg 80–85% by mass. An example of such a wax is that marketed in South Africa by Sasol Chemical Industries (Proprietary) Limited under the trade mark WAKSOL A, which has a congealing point of 29–33° C., typically 30° C. Hard or high-melting-point oxidized waxes typically have higher congealing points of about 70–90° C. An example of such a hard wax is that marketed in South Africa by Sasol Chemical Industries (Proprietary) Limited under the trade mark SASOLWAKS A6, which has a congealing point of 75–80° C., typically about 78° C. Additional waxes which can be used include that marketed in South Africa by Engen Limited under the trade mark ENGEN SLACKWAX 150, a slack wax, and that marketed in South Africa by the NCP Division of Sentrachem Limited under the trade mark PLASTICLOR, a chlorinated paraffin wax.

Naturally, instead of using a wax as described above, a blend may be used of a soft paraffin wax or slack wax with a waxy oil, or, indeed a waxy oil may be used by itself.

Waxy oils typically have a wax content of about 5–20% by mass. Suitable waxy oils include that marketed in South Africa by Sasol Chemical Industries (Proprietary) Limited under the trade mark WAKSOL F.

For use with unchlorinated paraffin waxes and/or oils, the emulsifier may be a long chain fatty acid having a carbon chain length of at least 12 carbon atoms, eg 16–20 carbon atoms, such as oleic acid or stearic acid. The long chain fatty acid may be present in a quantity of about 0,5–1,5% by mass of the wax and/or oil. The emulsifier may, instead, be an alkyl polyethylene glycol ether. A suitable alcohol polyethylene glycol ether is that marketed by Hüls AG (South Africa) (Proprietary) Limited under the trade mark MARLOWET PW. The alkyl polyethylene glycol ether emulsifier may be used in proportions similar to those set forth above for long chain fatty acid emulsifiers.

For use with chlorinated waxes and/or oils, the emulsifier may be a nonyl phenyl polyether. A suitable emulsifier of this type is that marketed under the trade mark EMULSIFIER 2757 by Hoechst (Proprietary) Limited. This emulsifier can also be used in proportions amounting to 0,5–1,5% by mass of the associated wax and/or oil.

Preferably, the water:dopant ratio is in the range 54:46 to 70:30; and in the particular application of the invention may be employed in the range 55:45 to 67:33, preferably 60:40 to 65:35.

While the broad idea of the invention as described above is applicable, in principle, to increasing the solubility of any inorganic salt solute in an aqueous solvent, a particular application of the present invention is in the preparation of supersaturated solutions in accordance with the present invention for the impregnation of wood by inorganic salts used in the treatment of wood. Such inorganic salts include wood preservative and/or flame retardant salts, which may be used alone or as combinations. Examples are diammonium phosphate, monoammonium phosphate, ammonium chloride, ammonium sulphate, borax, zinc chloride, orthophosphoric acid, boric acid, ammonium sulfamate, the hydrate of sodium oxyfluoroborate, ammoniacal basic zinc chloride, disodium octaborate tetrahydrate, ammonium biborate, ammonium pentaborate and mixtures of any two or more thereof.

The solution may thus form a wood-treatment composition for the impregnation of wood, the inorganic solute being selected from the group of wood preservative salts and flame retardant salts consisting of diammonium phosphate, monoammonium phosphate, ammonium chloride, ammonium sulphate, borax, zinc chloride, orthophosphoric acid, boric acid, ammonium sulphamate, the hydrate of sodium oxyfluoroborate, ammoniacal basic zinc chloride, zinc octaborate, [orthophosphoric acid, boric acid, ammonium sulfamate, ammoniacal basic zinc chloride,] disodium octaborate tetrahydrate, ammonium biborate, ammonium pentaborate and mixtures of any two or more thereof.

Preferred wood preservative and/or fire retardant salts include ammonium phosphate, sodium octaborate tetrahydrate, boric acid, mixtures of boric acid and borax, mixtures of ammonium phosphate and ammonium sulphate, mixtures of ammonium phosphate, ammonium sulphate and any one or more of the above boron compounds.

When used together, the preferred mass ratio of boric acid to borax is 2:3. When used together, the preferred mass ratio of ammonium phosphate to ammonium sulphate is 8:2 to 3:7, and is preferably about 1:1; and, when used together, the preferred mass ratio of ammonium phosphate, ammonium sulphate and one or more boron compounds is 1:1:1.

Naturally, in the preparation of a supersaturated solution for the purpose of wood impregnation as described hereunder, the proportion of the inorganic salt dissolved in the aqueous solvent phase will typically be as high as possible, ie substantially supersaturated, and at least higher than the proportion of said salt in pure form dissolved in pure water to form a saturated solution.

The invention extends to a supersaturated solution as described above, which has been prepared according to the method of the present invention as described above.

The supersaturated solution in accordance with the present invention containing an inorganic salt will typically be employed for the dip treatment of wood, eg wood sawn into boards or planks. In such treatment the wood is in the form of green timber, saturated with sap and the wood treatment salt or salts are applied to the wood by the dipping, to form a layer or coating on the wood of the supersaturated solution which forms part of an emulsion in accordance with the invention. The inorganic salts in the aqueous phase of the emulsion then diffuse into the interior of the wood via the medium of the wood sap.

The invention accordingly extends to a method of treating wood by impregnating an inorganic wood treatment salt into the wood, the method comprising coating the wood in a green state with a supersaturated solution as described above, to form a layer of the supersaturated solution on an outer surface of the wood, and allowing diffusion of the inorganic wood treatment salt dissolved in the solution to take place into the interior of the wood.

Conveniently the wood is smooth-sawn, the coating being by dipping the wood in the solution with the solution at room temperature. By green wood is meant wood which is uncured and not dried, and is sufficiently freshly cut for water therein to make up at least 50% of its mass.

The method may include the step, after the dipping, of stacking the wood to provide an open stack containing air spaces, the method comprising leaving the wood in such stack during said diffusion of the wood treatment salt into the wood, with the wood exposed to ambient air, to permit the wood to simultaneously dry.

As indicated above, green wood may, prior to the dipping, first be smooth-sawn, as contrasted with rough-sawn. Furthermore, the dipping may take place with the solution at room temperature.

The wood treatment aspect of the present invention may furthermore include the step, after the dipping, of sticker-stacking or filleted-stacking of the wood, whereby an open stack of planks or boards of the wood is provided with air spaces therebetween, the method involving leaving the wood in such stack during the above described diffusion of the wood treatment salt into the wood, preferably so as to achieve full penetration of the salt into the wood, and, also, to permit subsequent drying of the wood. A particular feature of the invention is that the stack may be left open and exposed to ambient air for the entire period that the stack exists, ie from the time of dipping until the wood is dry.

Although the method as described above with reference to the treatment of gauged or smooth sawn timber, it can naturally also be applied to rough sawn timber.

The present invention, when applied to the treatment of wood, has a number of particular advantages, with particular reference to the example as described hereunder.

The Applicant has dip treated wood by dipping it, typically in the form of boards or planks, in aqueous solutions of wood treatment salts, the wood being in the form of green timber. In such treatment, the wood is close-stacked, with the boards or planks in face-to-face and edge-on abutment, and the stack so formed is typically being wrapped in impermeable sheeting, to maintain a high moisture content in the wood during diffusion of the wood treatment salt into the wood, from a surface layer or coating of the solution in which the wood has been dipped, on the outer surface of the wood. Typically the sheeting is of a suitable plastics material such as polyethylene, and the stack is kept wrapped sufficiently long for full, or at least adequate, diffusion of the wood treatment salt into the wood to take place, usually about 2–6 weeks, depending on the wood moisture content, wood permeability and ambient temperature. When the diffusion is regarded to be sufficient or complete, the stack is unwrapped and destacked, and is then usually thereafter sticker-stacked or stacked in a filleted stack to permit drying of the timber. Furthermore, in this prior dipping process, in order to achieve high surface loadings of dipping solution on the wood which is dipped, it is customary to use rough sawn timber, to increase the surface area of the timber, so as to obtain as much wood treatment salt in the form of a layer or coating on the dipped timber as possible. For the same reason, saturated solutions of wood treatment salts, at elevated temperatures, have usually been used.

The concentration of the aqueous solution of wood treatment salts which is used to form the emulsion, i.e. the total mass of inorganic salt per liter of solution, may be about 200 g/l–500 g/l or more, and is preferably as high as possible.

The wood treatment solution may include a salt dispersant. A suitable salt dispersant has been found to be that marketed in South Africa by American Cyanamid Company (USA) under the trade mark AEROSOL 22. This dispersant comprises tetrasodium-N-1,2-dicarboxyethyl-N-octyldecyl-sulfosuccinamate. The salt dispersant may form from about 0,5–4% by mass of the emulsion.

The wood treatment salts may also include a small amount of an alkali or base. For example, a small amount of potassium hydroxide may be added for the purposes of saponification of the mixture. Typically, the base may be added in a quantity amounting to about 0,03–0,07% by mass of the emulsion.

The wood preservative salts, as indicated above, may be selected from the group of water soluble boron compounds including boric acid, boric oxide, borax, borax pentahydrate such as that marketed in South Africa by Borax Consolidated Limited under the trade mark NEOBOR, anhydrous borax such as that marketed in South Africa by Borax Consolidated Limited under the trade mark DEHYBOR, disodium octaborate tetrahydrate such as those marketed in South Africa by Borax Consolidated Limited under the trade marks POLYBOR, SOLUBOR or TIMBOR, ammonium biborate, ammonium pentaborate and mixtures of any two or more thereof.

The wood preservative salts are preferably selected form the group comprising POLYBOR, SOLUBOR or TIMBOR, boric acid, mixtures of boric acid and borax.

The mass ratio of boric acid to borax in the mixture of boric acid and borax, as mentioned above, is preferably about 2:3.

The mass ratio of boric acid equivalent to wax may range from 1:1 to 1:5. The preferred mass ratio is about 1:1,5. By boric acid equivalent is meant the mass of dissolved boric acid which provides the same amount of boron atoms in solution as the dissolved boron compound.

The retention level of boric acid equivalent i.e. the mass of boric acid equivalent per volume of wood for adequate preservation generally ranges from about 2–10 kg/m$^3$ depending on the conditions to which the treated wood is exposed. For example, a higher retention level may generally be required if the treated wood is subjected to severe weathering, for example if the treated wood is periodically exposed to contact with free water. The preferred level, in this case, may be about 6–10 kg/m$^3$. The preferred retention level in the case of wood which is exposed to milder e.g. in protected or semi-protected environments, weathering may be about 2–5 kg/m$^3$.

The retention level of the wax may be about 9–15 kg/m$^3$ in the case of severe weathering and about 3–7,5 kg/m$^3$ in the case of milder weathering.

The mass of wood preservative salts dissolved in the aqueous solution which is used to form an emulsion may amount, on a dry mass basis, to about 50–400 g/l boric acid equivalent, preferably 150–300 g/l boric acid equivalent, of the emulsion.

The emulsion may, naturally, include a pigment-imparting substance such as iron oxide or a suitable dye to impart colour to the treated wood. In addition the emulsion may naturally contain additional wood treatment compounds, such as anti-sap-stain compounds, anti-mould compounds, anti-fungal compounds, insecticidal compounds, or the like, to improve its broad-spectrum activity as a wood treatment composition.

The invention extends also to wood whenever impregnated with an inorganic wood treatment salt by a method as described above.

The invention will now be described, by way of non-limiting illustration, with reference to the following Examples, and with reference to the accompanying drawing, which is a plot of concentration of disodium octaborate in various wood dipping solutions according to the invention against disodium octaborate impregnated into wood specimens dipped therein and allowed to dry.

EXAMPLE 1

In this Example tests were carried out on green wet *Pinus patula* test samples having a nominal size of 150 mm×114 mm×38 mm. These samples were end-sealed with an epoxy resin to resist end-absorption of wood treatment solution, to simulate treatment of full length boards. Altogether nine samples were treated, three in accordance with the invention and six controls. A solution of POLYBOR was employed, POLYBOR being disodium octaborate tetrahydrate, the concentration having a boric acid equivalent of 25% m/m, ie the borate concentration providing a number of borate anions in solution equivalent to that obtained in a boric acid solution wherein the boric acid makes up 25% by mass of the solution.

The control samples were dipped in the POLYBOR solution, whereas, for a dipping solution for the samples in accordance with the invention, said POLYBOR solution was emulsified with wax, to obtain a final concentrated wax emulsion having a wax content of 35,7% by mass, the emulsion containing sufficient sodium borate to provide a concentration thereof of 1 part by mass of boric acid equivalent for every 1,5 parts by mass of wax. This was done by emulsifying the wax with water at 70° C. with the wax molten, to obtain a water-in-oil (water-in-wax) emulsion. In this water-in-oil emulsion a supersaturated solution of sodium borate in the water phase was made by dissolving sodium borate in the water phase at 20° C. The wax employed was ENGEN SLACKWAX 150, and an emulsifier was employed which was MARLOWET PW, being used in a proportion of 0,7% by mass. The final supersaturated solution of sodium borate in the water phase contained 19,3% by mass of boric acid equivalent in the water phase.

Six of these samples (controls) were dip-treated in the concentrated POLYBOR solution, which had been preheated to 50° C. to dissolve additional sodium borate, to achieve an average borate retention level, as boric acid, of about 5 kg/m$^3$. In this regard it is to be noted that retention levels as used in the Examples, refer to the concentration of borate, as boric acid, in oven-dried wood, dried to constant mass. Three of these samples were close-stacked and wrapped in polyethylene sheeting to simulate conventional wood treatment in this fashion, and the remaining three samples were sticker-stacked and left unwrapped and exposed to ambient air. The three samples in accordance with the invention were dip-treated in similar fashion at about 20° C. (ambient), but in the concentrated wax emulsion described above, and were then sticker-stacked and left unwrapped and exposed to ambient atmosphere. In this regard it is to be noted that the sodium borate concentration in the emulsion was also selected to provide an average boric acid retention level of about 5 kg/m$^3$.

After a holding period of three weeks, all the samples were cross-cut and sprayed with a curcumin indicator to determine the degree of boron diffusion, by measuring the depth of sodium borate penetration which had occurred. Results are set forth in the following table, Table 1.

TABLE 1

| DIPPING LIQUID | DIFFUSION CONDITIONS | AVERAGE RETENTION (kg/m$^3$) | AVERAGE DEPTH OF BORATE PENETRATION (mm) |
|---|---|---|---|
| Sodium borate solution | Close-stacked and sealed | 5 as boric acid equivalent | Complete |
| Sodium borate solution | Sticker-stacked and unsealed | 5 as boric acid equivalent | 4 mm |
| Emulsion (sodium borate solution and wax) | Sticker-stacked and unsealed | 5 as boric acid equivalent (and 7.5 wax) | Complete |

Compared with the close-stacked wrapped controls, which achieved complete borate penetration after three weeks, the controls which were sticker-stacked and unwrapped to be open to the atmosphere showed no significant boron penetration after three weeks, penetration being no more than about 4 mm.

In contrast, the samples dipped in emulsion in aqueous sodium borate/wax accordance with the invention achieved full borate penetration after three weeks when sticker-stacked and unwrapped to be open to the atmosphere.

Accordingly, samples treated in accordance with the present invention achieved the same degree of penetration when sticker-stacked and unwrapped as were achieved by the controls which were close-stacked and wrapped. To permit subsequent drying, the samples in accordance with the invention could in principle simply be left sticker-stacked until dry, whereas the close-stacked controls required to be unwrapped, unstacked and then sticker-stacked, before drying could take place. Bearing in mind that the samples in accordance with the invention permitted full penetration when sticker-stacked and unwrapped, this is an indication that the samples can be used, immediately after dipping, for construction purposes, penetration and subsequent drying taking place in situ.

EXAMPLE 2

In this Example tests were carried out to evaluate the present invention's ability to achieve low boron loss from treated timber when exposed to aboveground ambient conditions in a simulated accelerated rainfall test.

A formulation in accordance with the present invention was prepared by mixing together the following constituents in the following proportions:

| Constituent | Proportion (parts by mass) |
|---|---|
| TIMBOR | 23.0 |
| MOBILCER 246 | 56.5 |
| Water | 20.0 |
| Aerosol 22 | 0.5 |

The TIMBOR is disodium octaborate tetrahydrate powder; and MOBILCER 246 is a trade mark for an emulsion of SLACKWAX 150 with water and suitable emulsifiers, marketed in South Africa by Engen Limited. The formulation was obtained by mixing the constituents at ambient temperature to obtain an emulsion in which the TIMBOR was dissolved. It is to be noted that up to 2,5% by mass of the water can be replaced by an antifungal agent having utility against blue stain fungi.

Preliminary dipping tests were carried out with the above formulation and related formulations to determine what concentration of borate in the formulation would provide a borate uptake equivalent to 5 kg boric acid equivalent/$m^3$ wood, and the above formulation was selected on this basis. Specimens were weighed before and after dipping to determine the actual uptake thereby of borate.

Five green smooth-sawn *P. patula* specimens, end sealed with epoxy resin, measuring 300 mm×80 mm×20 mm were dipped in the formulation and were then open-stacked and allowed to dry in air at ambient temperature. When dry, the dipped specimens were exposed to the simulated rainfall test.

In this test the specimens, at ambient temperature, were exposed cyclically to sunlight and continuous water spraying. Each water-spraying cycle lasted 14 hours and took place overnight, and each sunlight cycle lasted 10 hours. At the end of the exposure period, which lasted for 28 days, the specimens were analyzed to determine what proportion of the impregnated borate originally present remained in the specimens. Results are set out in the following table, Table 2:

TABLE 2

| Specimen № | Boric Acid Equivalent Impregnated in Wood Before Rainfall Test (kg/$m^3$) | Boric Acid Equivalent Impregnated in Wood After Rainfall Test (kg/$m^3$) | Proportion of Boric Acid Equivalent Lost in Test (% by mass) |
|---|---|---|---|
| 1 | 4.03 | 2.95 | 26.8 |
| 2 | 4.45 | 2.95 | 33.7 |
| 3 | 4.24 | 3.35 | 21.0 |
| 4 | 4.35 | 2.95 | 33.0 |
| 5 | 5.69 | 3.30 | 42.0 |

The mean proportion of boric acid equivalent lost from the timber as set forth in Table 2 was 31,3% by mass. This compares well with timber conventionally treated with borate and exposed to the same accelerated rainfall test under identical conditions, where typically about 70–80% by mass of the boric acid equivalent is lost.

The borate uptake was determined by the mass differences in the samples before and after dipping, and the loss of borate was determined by quantitative analyses of the samples after the rainfall test.

It is to be noted that POLYBOR and TIMBOR are substantially the same, POLYBOR being the trademark under which the product is sold for agricultural uses, and TIMBOR being the trademark under which it is sold to the timber industry.

The Applicant has noted that the inclusion of Aerosol 22 substantially increases the solubility of the TIMBOR in water, but is unable to explain why, and, without being bound by theory, believes that other dispersants with similar surfactant properties will have a similar effect.

EXAMPLE 3

In this Example various dipping solutions were prepared from the same constituents as in Example 2, but with different concentrations of sodium borate dissolved therein. These solutions had, except for the proportion of TIMBOR, the same composition as that of Example 2 and were formulated in the same fashion. Seven solutions were prepared in this fashion, each comprising 56,5 parts by mass MOBILCER 246, 20,0 parts by mass water and 0,5 parts by mass AEROSOL 22, and comprising the proportions of borate set forth in Table 3 hereunder, where they are expressed in terms of boric acid equivalents.

Green smooth-sawn *P. patula* boards of 300 mm length, 150 mm breadth and various thicknesses, namely 38 mm, 50 mm and 75 mm were used as test specimens. The specimens were end-sealed with a microcrystalline paraffin wax manufactured under the trade mark SASOL MICROWAX 2408 by Sasol Chemical Industries (Proprietary) Limited, and were dipped in the formulations described above. The specimens were weighed before dipping and after dipping to determine the uptake thereby of borate. results are set forth in the following table, Table 3:

TABLE 3

| Solution № | Sodium Borate Solution Expressed as Boric Acid Equivalent Dissolved in the water phase (% by mass) | Amount of Borate Absorbed in Each Test Specimen Expressed at Boric Acid Equivalent for Board Thicknesses of 38 mm, 50 mm and 75 mm. (kg/$m^3$) 38 mm | 50 mm | 75 mm |
|---|---|---|---|---|
| 1 | 17.4 | 22.0 | 18.6 | 14.0 |
| 2 | 16.2 | 19.6 | 13.9 | 10.7 |
| 3 | 15.1 | 15.4 | 11.7 | 9.3 |
| 4 | 13.9 | 11.1 | 10.8 | 7.5 |
| 5 | 12.7 | 9.0 | 7.0 | 5.3 |
| 6 | 11.6 | 8.0 | 5.7 | 4.8 |
| 7 | 10.4 | 5.2 | 5.0 | 4.2 |

Results of this test, as set forth in Table 3, are plotted in the Figure, which is a plot of concentration in the test solution, expressed as % by mass of boric acid equivalent of the sodium borate dissolved in the aqueous phase. From the Figure it appears that a concentration of 9,8% in the dipping solution can be expected to give a concentration of 5 kg/$m^3$ of sodium borate—expressed as boric acid equivalent in the 38 mm boards, the value for 50 mm boards being 11,0% and for 75 mm boards being 12,1%.

EXAMPLE 4

Of the solutions tested in Example 3, those giving results close to 5 kg/$m^3$, expressed as boric acid equivalent, of sodium borate impregnated into the various specimens were investigated further. These solutions were Solution No 7 for both 38 mm boards and 50 mm boards and Solution No 5 for 75 mm boards. Thus, the 38 mm and 50 mm specimens were dipped in Solution No 7 and the 75 mm specimens were dipped in Solution No 5.

The dipped specimens were then left to air-dry in an open-stacked condition and were investigated by cross-cutting (across the grain of the boards) and spraying with a boron detecting reagent according to South African Bureau of Standards (SABS) Test Method No 995, followed by visual assessment to determine the depth of borate anion penetration therein.

From the cross-cutting and testing according to Method No 995 it appeared that full cross-sectional penetration took place after 6 weeks and further such cross-cutting and testing after 12 weeks and 18 weeks showed no change.

It follows that the present invention, particularly with reference to the Examples described above has, at least in principle, a number of material potential advantages.

As the solutions of the present invention are supersaturated, as described above, with reference to the wood treatment salts dissolved therein, increased amounts of the dissolved salts are present in a surface coating on the wood being treated, compared with a surface coating of the same volume of a saturated solution of the salt or salts in question, dissolved in pure water without any emulsifier or wax/oil dopant. In this regard it is to be noted that, when the supersaturated solution is part of an emulsion, the emulsion has increased viscosity, so that, in addition to a higher concentration of the wood treatment salt or salts, the surface layer or coating retained on the wood and provided by the dipping is thicker and comprises a higher volume of treatment solution, compared with the volume retained on the wood of a saturated solution of the salt or salts in question, dissolved in pure water and without any emulsifier or wax/oil dopant. This feature contributes to increased surface loadings on the treated wood of the wood treatment salt or salts.

This increased loading has the effect that adequate wood treatment salt quantities or surface loadings can be obtained on the wood surface after dipping, at ambient temperatures and without the need for heating the wood treatment solution to increase salt solubility.

A further unexpected advantage of the present invention is that an oily or particularly a waxy layer can be formed on the wood surface, which resists rapid drying out of the moisture of the sap in the green wood after treatment, but at the same time releases the wood treatment salts dissolved in the dipping solution to render them available for diffusion into the wood via the sap in the wood. It is this feature which allows immediate sticker-stacking or filleted-stacking for the purpose of impregnation and subsequent drying, without initial close-stacking and wrapping to seal the timber until diffusion is complete, after which close-stacking the wood has to be unstacked and sticker-stacked or filleted-stacked for the purpose of drying. The present invention thus permits substantially reduced handling, and can effectively eliminate the holding periods required for diffusion when the wood is close-stacked and wrapped.

The higher concentrations of dissolved wood treatment salts achievable on the wood, and increased viscosity, mentioned above, can permit the dipping of smooth-sawn or gauged timber, which is to be contrasted with the prior dipping of rough-sawn timber.

After dipping and drying, an oily or particularly a waxy layer on the outer surface of the treated wood can retard leaching of the soluble wood treatment salts from the treated wood under wet conditions. Furthermore, such oily or particularly waxy layers can provide water repellency, to retard water absorption into the wood, with consequent improved dimensional stability of the wood.

Thus, Example 1 demonstrated that, in accordance with the invention, smooth-sawn green wood specimens can be dipped and left open-stacked (sticker-stacked) to dry, exposed to the ambient air, for simultaneous diffusion of borate into the wood and drying. Example 2 confirmed Example 1 and showed that the impregnated wood is highly resistant to borate leaching by rain. Examples 3 and 4 again confirmed the results of Example 1 and showed that various borate concentrations in the dipping solutions could provide different borate concentrations in dipped wood specimens and showed that drying of the wood can be retarded, with the wood open-stacked, until full penetration of the wood by the borate had taken place.

In view of the aforegoing features, the treated wood can in principle be employed for low cost housing in situations where intermediate kiln drying of timber is uneconomical. In these situations, the green, dipped treated timber can be used directly for construction, without sticker-stacking and drying, the diffusion of the water treatment salt or salts into the wood taking place, with subsequent drying, with the wood in situ. In this case, the oily or particularly waxy outer layer achievable on the wood can retard drying out of the green timber, thus reducing any drying degrade of the timber which can occur in situ.

The utility of the present invention, with regard to the treatment of wood is highly unexpected, namely the ability of the wood treatment solutions, emulsified with waxes and/or oils in the form of water-in-oil or water-in-wax emulsions, not only to provide smooth-sawn green wood with thick dip coatings containing high borate concentrations which remain in a wet condition on the wood for several weeks, but also to prevent or substantially to retard drying of the coated wood, and, importantly, to permit borate to diffuse into the wood before permitting the wood to air-dry. These results are highly unexpected because the aqueous phase of the emulsion, containing the borate, is the discontinuous phase, so that it is in fact the wax or oil phase, which is the continuous phase, which in fact coats the wood, the aqueous phase being in the form of discontinuous droplets in the organic phase, separated from the wet interior of the wood by the organic phase. Diffusion of borate from the aqueous phase into the wood would thus be expected to be retarded to the same extent that drying of the wood is retarded. The Applicant is unable to explain why, although drying of wood is retarded, this diffusion apparently takes place relatively quickly, sufficiently fast for diffusion to be complete before the wood is dry.

We claim:

1. A solution of an inorganic solute in an aqueous solvent, the solute being selected from the group consisting of wood preservative salts and flame retardant salts and the solution being supersaturated at temperatures below 30° C., the solvent comprising an aqueous phase dispersed in an organic phase in the form of an organic dopant comprising both an emulsifier and a constituent selected from the group consisting of oils, waxes and mixtures thereof, and the mass ratio between the water in the aqueous phase and the dopant being 40:60 to 80:20, the dopant being emulsified with the aqueous phase and the emulsifier being a water-in-oil emulsifier, the dopant and aqueous phase forming a water in oil emulsion, the solution forming a wood-treatment composition for the impregnation of wood, the inorganic solute being selected from the group consisting of ammonium chloride, ammonium sulphate, borax, zinc chloride, orthophosphoric acid, boric acid, ammonium sulphamate, the hydrate of sodium oxyfluoroborate, ammoniacal basic zinc chloride, zinc octaborate, disodium octaborate tetrahydrate, ammonium biborate, ammonium pentaborate and mixtures of any two or more thereof.

* * * * *